United States Patent
Jourdan et al.

(10) Patent No.: US 11,440,809 B2
(45) Date of Patent: Sep. 13, 2022

(54) APPARATUS AND PROCESS FOR THERMAL DENITRATION, USE OF SUCH AN APPARATUS AND PRODUCT OBTAINED BY MEANS OF SUCH A PROCESS

(71) Applicant: Areva NC, Courbevoie (FR)

(72) Inventors: Alex Jourdan, Orange (FR); Marc Dupoizat, St-Paul-Trois-Chateaux (FR)

(73) Assignee: Areva NC, Courbevoie (FR)

( * ) Notice: Subject to any disclaimer, the term of this patent is extended or adjusted under 35 U.S.C. 154(b) by 608 days.

(21) Appl. No.: 15/735,441

(22) PCT Filed: Jun. 10, 2016

(86) PCT No.: PCT/EP2016/063377
§ 371 (c)(1),
(2) Date: Dec. 11, 2017

(87) PCT Pub. No.: WO2016/198654
PCT Pub. Date: Dec. 15, 2016

(65) Prior Publication Data
US 2018/0179081 A1 Jun. 28, 2018

(30) Foreign Application Priority Data
Jun. 12, 2015 (FR) ...................... 15 55380

(51) Int. Cl.
*B01J 8/00* (2006.01)
*C01G 43/01* (2006.01)
(Continued)

(52) U.S. Cl.
CPC ......... *C01G 43/01* (2013.01); *B01D 39/2027* (2013.01); *B01D 45/08* (2013.01);
(Continued)

(58) Field of Classification Search
CPC . C01G 43/01; B01J 8/003; B01J 8/005; B01J 8/006; B01J 8/007; B01J 8/1881;
(Continued)

(56) References Cited

U.S. PATENT DOCUMENTS

| | | | |
|---|---|---|---|
| 2,755,853 A | * | 7/1956 | Edgett .................... C01G 43/01 159/25.2 |
| 2,981,592 A | | 4/1961 | Lawroski |

(Continued)

FOREIGN PATENT DOCUMENTS

| | | |
|---|---|---|
| CN | 85103081 A | 10/1986 |
| WO | 84/02124 A1 | 6/1984 |

OTHER PUBLICATIONS

Translation RU2599670 C1 (Year: 2015).*
(Continued)

*Primary Examiner* — Hoa (Holly) Le
(74) *Attorney, Agent, or Firm* — Pearne & Gordon LLP

(57) ABSTRACT

An apparatus (1) for thermal denitration of a uranyl nitrate hydrate to uranium trioxide UO3. The apparatus (1) comprises a burner (114) and a reaction chamber (110) configured to carry out thermal denitration of uranyl nitrate hydrate and to form uranium trioxide UO3 in the form of particles. The apparatus also comprises a separating chamber (120) suitable for separating UO3 particles from the gases resulting from the thermal denitration carried out in the reaction chamber (110), and at least one filter (130) configured for purifying the gases. The separating chamber (120) is a decanting chamber into which the reaction chamber (110) directly opens out. The filter (130) is capable of performing the separation at a temperature greater than or equal to 350° C. The invention also relates to use of such an apparatus, to a thermal denitration process and to UO3 particles obtained by such a process.

15 Claims, 3 Drawing Sheets

(51) Int. Cl.
| | |
|---|---|
| *B01J 19/24* | (2006.01) |
| *B01J 19/26* | (2006.01) |
| *B01J 4/00* | (2006.01) |
| *B01D 50/20* | (2022.01) |
| *B01D 39/20* | (2006.01) |
| *B01D 45/08* | (2006.01) |
| *B01D 49/00* | (2006.01) |
| *B01J 6/00* | (2006.01) |

(52) U.S. Cl.
CPC ........... *B01D 49/003* (2013.01); *B01D 50/20* (2022.01); *B01J 4/002* (2013.01); *B01J 6/008* (2013.01); *B01J 19/24* (2013.01); *B01J 19/26* (2013.01); *B01J 2219/00157* (2013.01); *B01J 2219/19* (2013.01); *B01J 2219/1946* (2013.01); *C01P 2006/12* (2013.01); *C01P 2006/80* (2013.01); *C01P 2006/82* (2013.01)

(58) Field of Classification Search
CPC .............. B01J 19/24; B01J 2219/00157; B01J 2219/185; B01J 2208/00504; B01J 2208/00473; B01J 2208/00752; B01J 2208/00761; B01J 2208/00769; B01J 2208/00991
USPC ............................................... 34/79, 82, 165
See application file for complete search history.

(56) References Cited

U.S. PATENT DOCUMENTS

| | | | | |
|---|---|---|---|---|
| 3,041,136 | A | * | 6/1962 | Hedley ................ C01G 43/025 423/261 |
| 4,585,634 | A | * | 4/1986 | Bachelard ............. C01G 43/01 423/260 |
| 4,687,601 | A | | 8/1987 | Bachelard et al. |
| 4,871,518 | A | * | 10/1989 | Yoon ...................... C01G 43/00 423/11 |
| 5,628,048 | A | | 5/1997 | Schaal |
| 9,511,339 | B2 | * | 12/2016 | Yang ...................... B01J 8/0055 |
| 2010/0319634 | A1 | * | 12/2010 | Franklin ................ F23G 7/008 122/367.1 |

OTHER PUBLICATIONS

Ondrejcin, Thermal Denitration of Uranyl Nitrate Hexahydrate, Journal of Chemical and Engineering Data,, vol. 11, No. 1, Jan. 1966 (Year: 1966).*
Search Report issued in French Patent Application No. 1555380 dated Apr. 12, 2016.
International Search Report issued in Application No. PCT/EP2016/063377 dated Jul. 27, 2016.
Written Opinion issued in Application No. PCT/EP2016/063377 dated Jul. 27, 2016.

* cited by examiner

-Prior Art-

APPARATUS AND PROCESS FOR THERMAL DENITRATION, USE OF SUCH AN APPARATUS AND PRODUCT OBTAINED BY MEANS OF SUCH A PROCESS

TECHNICAL FIELD

The present invention relates to a facility for thermally denitrating a uranyl nitrate hydrate for obtaining uranium trioxide, this uranium dioxide having the form of particles.

The invention also relates to a use of such a facility for making a thermal denitration of a uranyl nitrate hydrate, in particular the thermal denitration of a uranyl nitrate hexahydrate.

The present invention finally relates to a process for thermally denitrating a uranyl nitrate hydrate into uranium trioxide, as well as the uranium trioxide directly obtained by this thermal denitration process, this uranium dioxide having the form of particles.

State of Prior Art

Obtaining uranium trioxide $UO_3$ by thermally denitrating uranyl nitrate hexahydrate $UO_2(NO_3)_2,6H_2O$ is well known and is made according to the following reaction:

$$UO_2(NO_3)_2,6H_2O \rightarrow UO_3 + 2NO_2 + \tfrac{1}{2}O_2 + 6H_2O.$$

The uranium trioxide $UO_3$ obtained can then be reduced into uranium dioxide $UO_2$. By reaction with hydrofluoric acid, this uranium dioxide $UO_2$ can then be transformed into uranium tetrafluoride $UF_4$ which plays a major role in various nuclear industry processes.

As taught by document WO 84/02124 A1, hereinafter referred to as [1], the yield of the fluoridation reaction of $UO_2$ into $UF_4$ is directly related to the reactivity of uranium dioxide $UO_2$ and, hence, to that of uranium trioxide $UO_3$ obtained upstream by thermal denitration. Document [1] sets forth that this reactivity of uranium trioxide $UO_3$ is directly correlated with its specific surface area which, measured according to the BET method, should have a value at least equal to 15 $m^2/g$.

Document U.S. Pat. No. 5,628,048, referred to as [2], confirms that uranium trioxide $UO_3$ is considered as very reactive if it has a BET specific surface area between 12 $m^2/g$ and 15 $m^2/g$. More particularly, the process which is described in document [2] to obtain, from a uranyl nitrate solution, a uranium trioxide having such a specific surface area, consists in making, in a zone of a reaction chamber called a contact zone, a thermomechanical contact between the uranyl nitrate solution, sprayed into fine droplets along a given axis in the contact zone, and a gaseous fluid introduced in the contact zone, the gaseous fluid being at a sufficiently high temperature and having a sufficiently high mechanical energy to make, in the contact zone, dehydration and calcination of uranyl nitrate.

Document [2] describes, besides, a facility for thermally denitrating uranyl nitrate suitable for implementing the process above.

This facility, schematically represented in the appended FIG. 1 and described in connection with the thermal denitration of uranyl nitrate hexahydrate, comprises:
- a burner 4,
- a reaction chamber 1 disposed at the outlet of the burner 4 and including an inlet of uranyl nitrate hexahydrate and configured to make a thermal denitration of the uranyl nitrate hexahydrate and form uranium trioxide $UO_3$ having the form of particles,
- a separation chamber 8 adapted to separate a part of the $UO_3$ particles from the gases from the thermal denitration made in the reaction chamber 1, and
- a filter 12 configured to separate the other part of the $UO_3$ particles from said gases and thus scrub said gases.

In document [2], the reaction chamber 1 is delimited by a cylindrical shell extending at each end into a cone reducing the inlet 2 and outlet 3 sections of the reaction chamber 1. The inlet 2 is connected to a burner 4 supplied with air by the piping 5 and with fuel gas by the piping 6. A piping 7 enables the reaction chamber 1 to be supplied with uranyl nitrate hexahydrate. The outlet 3 of the reaction chamber 1 is connected, through a conduit 9, to the separation chamber 8 which consists of a cyclone.

Among the $UO_3$ particles formed in the reaction chamber 1, those which have a mean particle diameter of at least 15 µm are recovered by the conduit 10 connected to the bottom outlet of the cyclone 8. The other particles, having a lower mean particle diameter, called fine particles, are conveyed by the gas vents on top of the cyclone 8 and are sent through the conduit 11 to the filter 12 which is a bag filter. The fine particles are recovered by the conduit 13. The dust-free gases are sucked, thanks to a fan located at the outlet of the filter 12, by a conduit 14.

The implementation of a facility as described in document [2] has however a number of drawbacks.

Among these drawbacks, some are directly related to the methods for collecting the $UO_3$ particles formed in the reaction chamber 1.

First, collecting the $UO_3$ particles is made through, not only a single conduit, but two conduits, herein the conduits 10 and 13.

On the other hand, since the $UO_3$ particles obtained by this process have a mean particle diameter not exceeding 5 µm, the separation yield obtained by means of the cyclone 8 is low, typically in the order of 30%, most of the $UO_3$ particles being collected by the bag filter 12 and collected at the conduit 13. Consequently, the implementation of a facility as described in document [2] results in a permanent overload of the bag filter 12. Besides, it should be noted that the overload occurs, even in the case where the bag filter 12 is equipped with a continuous declogging device. Such an overload of the bag filter 12 generates a head loss which can be detrimental in the case of a facility for treating nuclear materials. Indeed, safety rules applied to the field of nuclear material treatment impose that such a facility is kept depressurised with respect to the surrounding atmosphere so as to make up a dynamic containment barrier, in particular in the hypothesis of a leak on one of the pieces of equipment of said facility. Thus, difficulties for keeping a low head loss on the bag filter 12 can have repercussions on the overall depression control of the corresponding facility.

Furthermore, the material making up the bags of the bag filter 12 is degraded from service temperatures in the order of 200° C. Given that the denitration reaction temperature is established between 350° C. and 500° C., it is thus mandatory to cool the gaseous stream circulating in the conduit 11 by a complementary fresh air circulation device the flow rate of which is typically in the order of 300 kg/h. An increase in the overall flow rate of the gas to be treated at the outlet of the facility, which flow rate is established about 460 kg/h to 500 kg/h at the outlet of the conduit 14, negatively impacts the overall cost of the thermal denitration process, by increasing the size of the piece of equipment and the increased energy consumption it imposes.

Further, it is observed that depending on their collecting place, $UO_3$ particles have well distinct morphological characteristics.

Thus, the $UO_3$ particles collected at the conduit 10 connected to the cyclone 8 have a BET specific surface area in the order of 20 to 25 $m^2/g$. These $UO_3$ particles thus have a very good reactivity in view of their subsequent transformation into uranium dioxide $UO_2$ and then into uranium tetrafluoride $UF_4$.

The $UO_3$ particles collected at the conduit 13 connected to the bag filter 12 have in turn a BET specific surface area lower than 12 $m^2/g$. The $UO_3$ particles collected at the conduit 13 thus have a lesser reactivity for being transformed into $UO_2$ and then into $UF_4$ than those collected at the conduit 13.

The solution assumed to date to obtain, with a good yield, $UO_3$ particles having morphological characteristics compatible with the reactivity required for their subsequent transformation into $UO_2$ and then into $UF_4$, consists in operating the mixture of the $UO_3$ particles which are respectively collected at the conduits 10 and 13 of the facility described in document [2]. Thus, a mixture of $UO_3$ particles having a mean BET specific surface area, typically between 12 $m^2/g$ and 15 $m^2/g$ is obtained.

Other drawbacks are related to the configuration of the reaction chamber 1 of the facility described in document [2]. Indeed, the $UO_3$ particles formed by thermal denitration in the contact zone of the reaction chamber 1 are projected onto the conical lower wall of this chamber 1 and cause an erosion and thus wear over time of this lower wall. Further, the conical geometry of the lower end of this reaction chamber 1 promotes build-up of $UO_3$ particles and thus plugging of the outlet 3, requiring washing operations making the facility unavailable during these operations.

The purpose of the invention is consequently to overcome drawbacks of the facility of prior art and to provide a facility for thermally denitrating a uranyl nitrate hydrate into uranium trioxide which enables, with a good yield, uranium trioxide particles to be obtained, which have morphological characteristics higher than the morphological characteristics of the mixture of uranium trioxide particles collected at the conduit 10 disposed at the outlet of the separation chamber or cyclone 8, on the one end, and of the particles collected at the conduit 13 disposed at the outlet of the bag filter 12 of the facility described in document [2].

Complementarily, this facility should also make it possible to solve one or more of the problems that can be observed during the implementation of the facility described in document [2], in particular those which are related:

to the head loss observed because of the overload of the bag filter 12, to wear of the lower wall of the reaction chamber 1, or even to plugging of the outlet 3 of the reaction chamber 1.

The facility according to the invention should further have a simplified configuration relative to that of the facility described in document [2], by avoiding in particular the implementation of complementary devices for cooling some of the gaseous streams.

DISCLOSURE OF THE INVENTION

The purposes previously set out as well as other ones are achieved, firstly, by a facility for thermally denitrating a uranyl nitrate hydrate, having the formula $UO_2(NO_3)_2,xH_2O$ with $2 \leq x \leq 6$, into uranium trioxide $UO_3$ including:

a burner, a reaction chamber disposed at the outlet of the burner and including an inlet of uranyl nitrate hydrate, said reaction chamber and the burner being configured to make a thermal denitration of the uranyl nitrate hydrate and to form uranium trioxide $UO_3$ having the form of particles, a separation chamber adapted to separate a part of the $UO_3$ particles from the gases from the thermal denitration made in the reaction chamber, and at least one filter configured to separate the other part of the $UO_3$ particles from said gases and thus scrub said gases.

According to the invention, the separation chamber of the facility is a sedimentation chamber into which the reaction chamber directly opens and the filter is able to make the separation at a temperature higher than 350° C.

In accordance with the understanding of those skilled in the art, it should be understood, above and in the rest of this document, by "sedimentation chamber", an enclosure having defined dimensions and volume in which a non-miscible mixture is introduced, such as solid particles contained in a carrier gas, and which uses the gravity effect to separate the different phases, namely to separate the particles from the carrier gas. In such a sedimentation chamber, under the gravity effect, the large and medium size particles drop downwardly and are recovered in the bottom of the sedimentation chamber, the finer ones and the carrier gas remain in the upper part by continuing their trajectory to the filter(s).

The presence of a sedimentation chamber as a separation chamber enables the $UO_3$ particles formed in the reaction chamber by thermally denitrating the uranyl nitrate hydrate to be particularly efficiently separated from the reaction gases. Indeed, most of $UO_3$ particles are collected at the outlet of the sedimentation chamber, typically with a yield of at least 65%, that is a yield much higher than that of 30% obtained with the cyclone 8 of the facility described in document [2]. Hence, an overload of the filter(s) is avoided, which enables to overcome all the drawbacks related to the head loss generated by the overload of the bag filter describes in document [2].

Furthermore, with one or more filters able to make the separation at a temperature higher than 350° C., it is not necessary to provide a complementary fresh air circulation device. Unlike the facility described in document [2], it is therefore not essential to increase the size of the piece of equipment and thus the energy consumption that this would generate. The facility according to the invention is thus of a simplified configuration relative to that described in document [2].

By the terminology "directly opens into" above and in the rest of this document, it should be understood that the outlet of the reaction chamber is in direct fluid communication with the separation chamber, in the absence of any conduit or piping connecting them to each other. In this manner, the outlet of the reaction chamber can be considered as being comprised in the separation chamber.

The inventors have besides observed that, unexpectedly and surprisingly, the $UO_3$ particles collected at the outlet of the sedimentation chamber have morphological characteristics higher than those of the mixture of the $UO_3$ particles collected by means of the facility described in document [2].

In particular, and as illustrated in the experimental part hereinafter, these particles can have the following characteristics:

a BET specific surface area higher than or equal to 17 m²/g, a water weight percentage lower than or equal to 0.4% wt, and a weight percentage of nitrate ions $NO_3^-$ lower than or equal to 0.8% wt.

Thus, the $UO_3$ particles collected at the outlet of the sedimentation chamber have a reactivity perfectly adapted for their subsequent transformation into uranium dioxide $UO_2$ and then into uranium tetrafluoride $UF_4$.

It would seem indeed that the filtration made at temperatures higher than or equal to 350° C., and typically between 350° C. and 500° C., enables rehydration of the $UO_3$ particles formed to be limited and thus their specific surface area to be significantly improved.

The upper part of the separation chamber can include at least one gas outlet equipped with the filter to discharge the gases after they have been separated from the particles.

The separation chamber can include at least one gas outlet toward the filter.

The facility can further include a gas deflecting means for deflecting the gases exiting the mouth of the reaction chamber in the separation chamber at a sedimentation location of the separation chamber the vertical dimension of which is lower than that of the gas outlet.

Such a deflecting means enables the separation yield of the separation chamber to be optimised. Indeed, since the gases and particles are deflected by the deflecting means onto the deflecting location having a vertical dimension lower than that of the filter, only the finest particles driven by the hot gases are likely to reach the filter and not to be separated from the gases.

Such a difference in vertical dimension makes it possible to provide a particle size threshold from which the particles are separated from the gases by sedimentation, the rest of the particles being recovered by declogging at the filter(s) located at the gas outlet. In this manner, it is thus possible to optimise the recovery of $UO_3$ particles at the outlet of the sedimentation chamber and to limit the clogging risks of the filter(s).

The orientation terms, such as "vertical dimension", "height", "lower end", used above as well as in the rest of this document are of course intended for a facility operating or about to operate and relative to gravity. Thus, the vertical dimension corresponds to the distance relative to the ground along the gravity direction, the height is the dimension along the same gravity direction and the lower end is the end closest to the ground.

In this document, as regards the invention, the terms "separation chamber" and "sedimentation chamber" are used in turn to designate the separation chamber of the facility according to the invention and are thus interchangeable, without modifying the meaning thereof.

The vertical dimension of the sedimentation location can be lower than that of the gas outlet by a height h, the separation chamber having a height H.

The ratio h to H, noted h/H, can be between 0.1 and 0.5.

Advantageously, h/H is between 0.2 and 0.3 and, preferentially, between 0.23 and 0.27.

With such a ratio h/H, the separation yield of $UO_3$ particles from the gases is optimum. Indeed, for a ratio h/H lower than 0.1, or even 0.2, a part of the $UO_3$ particles can be directly driven in the filter. As a result, there is a decrease in the separation yield and a strong increase in the clogging risks for the filter. For a ratio h/H higher than 0.5, or even 0.3, the thermal stresses on the walls of the separation chamber become significant, which can thereby cause a damage on the same.

The gas deflecting means can be provided by a partial housing of the reaction chamber in the separation chamber, the mouth of the reaction chamber in the separation chamber defining the sedimentation location.

A facility according to the invention, with such a deflecting means, is particularly compact, while keeping a high separation yield of its separation chamber.

The gas deflecting means can include a deflecting wall separating the mouth of the reaction chamber from the gas outlet, the lower end of said deflecting wall defining the sedimentation location.

A facility according to the invention including such a deflecting means is particularly advantageous to allow the maintenance of the separation chamber without altering its separation yield. Indeed, the separation chamber has no zone the access of which would be limited by the presence of the separation chamber.

The side walls of the separation chamber can have only wall sections making an angle with the vertical which is lower than 60°, preferentially than 45°.

Thus, the risks of depositing the $UO_3$ particles onto the side walls of the separation chamber are limited. The residence time in the separation chamber of these $UO_3$ particles is thereby reduced, decreasing accordingly the rehydration risks of said particles.

The filter is advantageously made of a material allowing filtration in an environment the temperature of which is higher than or equal to 300° C. The filter can thus be a filter comprising a material such as a wire mesh or even a ceramic or sintered metal candle type filter.

The filter can advantageously be a sintered metal type filter.

Thus, thanks to the implementation of filters as mentioned above, the problem of thermal resistance of the bag filter 12 of the facility described in document [2] is overcome even more efficiently.

The burner and the reaction chamber can be configured to provide, at the outlet of the reaction chamber, a gas rate between 1 m/s and 2 m/s and, advantageously, between 1.4 m/s and 1.7 m/s.

Thus, the recovery of $UO_3$ particles is optimised at the outlet of the sedimentation chamber, while limiting the clogging risks of the filter(s).

The facility can include at least two parallel filters of the sintered metal type, the facility preferentially including four parallel filters of the sintered metal type.

The use of several sintered metal type filters enables the dimension and weight of each of the filters to be decreased. Maintenance operations of the facility are thereby facilitated.

The invention relates, secondly, to a use of a facility for making a thermal denitration of a uranyl nitrate hydrate having the formula $UO_2(NO_3)_2,xH_2O$ with $2 \leq x \leq 6$.

The facility the use of which is a subject matter of the invention is the facility as defined above, wherein the advantageous characteristics of this facility can be taken alone or in combination.

The use of such a facility benefits from the aforementioned advantages.

In an advantageous alternative, the uranyl nitrate hydrate can be uranyl nitrate hexahydrate of the formula $UO_2(NO_3)_2,6H_2O$.

The invention relates, thirdly, to a process for thermally denitrating a uranyl nitrate hydrate having the formula $UO_2(NO_3)_2,xH_2O$ with $2 \leq x \leq 6$.

According to the invention, this process comprises:
- a step of thermally denitrating a uranyl nitrate in a reaction chamber by means of a burner, the reaction chamber being disposed at the outlet of said burner, whereby $UO_3$ particles are obtained in a mixture with gases,
- a step of separating a part of these $UO_3$ particles from the gases which is made in a sedimentation chamber into which the reaction chamber directly opens,
- a filtration step for separating the other part of the $UO_3$ particles from said gases and thus scrubbing said gases, said step being made at a temperature higher than or equal to 350° C., and
- a step of recovering the $UO_3$ particles.

By virtue of the process according to the invention, and as previously indicated, the separation of the $UO_3$ particles formed in the reaction chamber by thermal denitration is particularly efficient.

It will be furthermore noted that such a process consisting of these steps only enables $UO_3$ particles having perfectly adapted characteristics for their subsequent transformation into uranium dioxide $UO_2$ and then into uranium tetrafluoride $UF_4$ to be obtained.

This process also makes it possible to overcome all the drawbacks related to the head loss generated by the overload of the bag filter 12 described in document [2].

The inventors have on the other hand observed that, unexpectedly and surprisingly, the $UO_3$ particles collected at the outlet of the sedimentation chamber have morphological characteristics much higher than those of the $UO_3$ particles collected by means of the process described in document [2].

Such a process is particularly adapted to be implemented by means of a facility according to the invention.

The step of separating a part of the $UO_3$ particles from the gases can comprise the following sub-steps of:
- deflecting the particles and gases from the heat treatment step into a sedimentation location having a vertical dimension lower than a gas outlet of the filter used during the filtration step,
- sedimenting a part of the $UO_3$ particles which is collected in the sedimentation chamber.

Such a deflection of particles into a sedimentation location enables the separation yield of the sedimentation step to be optimised.

During a separation step, gases from the thermal denitration can be introduced in the separation chamber with a gas rate between 1 m/s and 2 m/s and, advantageously, between 1.4 m/s and 1.7 m/s.

The invention relates fourthly to $UO_3$ particles.

According to the invention, these particles are directly obtained by the process as described above, the advantageous characteristics of this process being possibly taken alone or in combination, the $UO_3$ particles having the following characteristics:
- a BET specific surface area higher than or equal to 17 $m^2/g$,
- a water weight percentage lower than or equal to 0.4% wt, and
- a weight percentage of nitrate ions $NO_3$ lower than or equal to 0.8% wt.

Such $UO_3$ particles have a reactivity perfectly adapted for their subsequent transformation into uranium dioxide $UO_2$ and then into uranium tetrafluoride $UF_4$.

In an alternative of the invention, the BET specific surface area of $UO_3$ particles is between 17 $m^2/g$ and 21.5 $m^2/g$, advantageously between 17.5 $m^2/g$ and 21 $m^2/g$ and, preferentially, between 18 $m^2/g$ and 20 $m^2/g$.

BRIEF DESCRIPTION OF THE FIGS

The present invention will be better understood upon reading the description of exemplary embodiments, given by way of purely indicating and in no way limiting purposes, making reference to the following appended FIGS.

FIG. 1 schematically illustrates the facility described for implementing the process for obtaining uranium trioxide $UO_3$ by thermal denitration of uranyl nitrate taught by document [2].

Figure 4A:
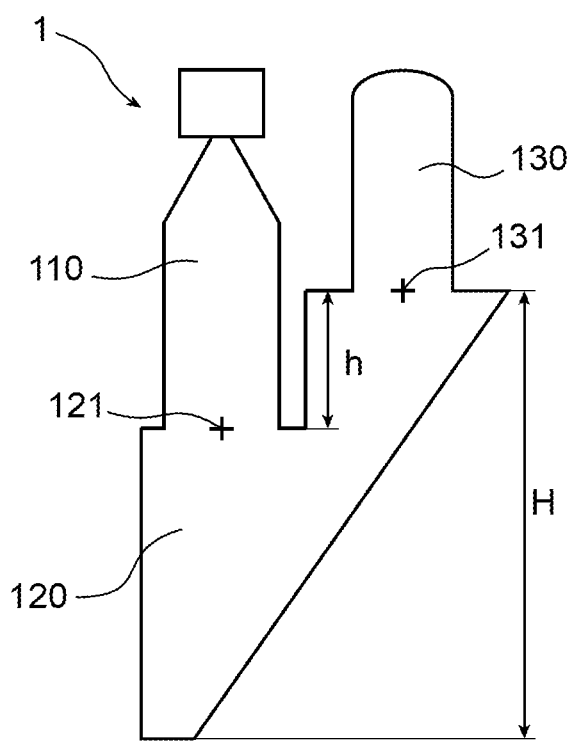
Figure 4B:
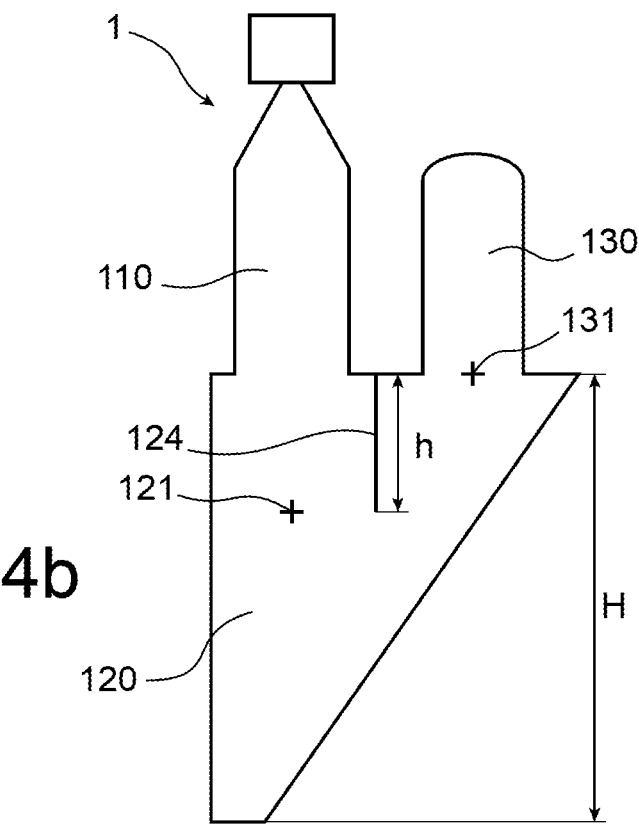

FIGS. 4a and 4b schematically illustrate two alternatives of arrangement of the reaction chamber and the separation chamber for a facility according to the invention.

Identical, similar or equivalent parts of the different FIGS. bear the same reference numerals so as to facilitate switching from one FIG. to the other.

The different parts represented in the FIGS. are not necessarily drawn to a uniform scale, to make the FIGS. more readable.

The different possibilities (alternatives and embodiments) should be understood as being not exclusive of each other and can be combined with each other.

DETAILED DISCLOSURE OF PARTICULAR EMBODIMENTS

Figure 2:
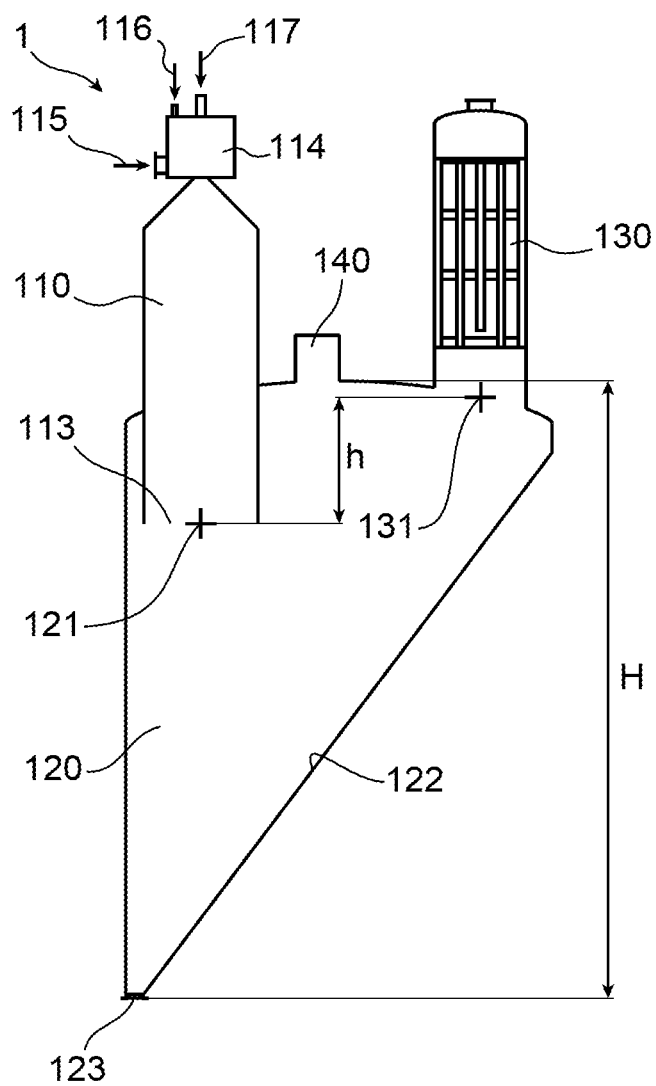
FIG. 2 illustrates a facility for thermally denitrating a uranyl nitrate hydrate according to the invention along a cross-section view along the axis A-A of FIG. 3.

FIG. 2 illustrates a facility 1 according to the invention for making a thermal denitration of a uranyl nitrate hydrate having the formula $UO_2(NO_3)_2,xH_2O$ with $2 \leq x \leq 6$, into uranium trioxide $UO_3$.

Figure 3:
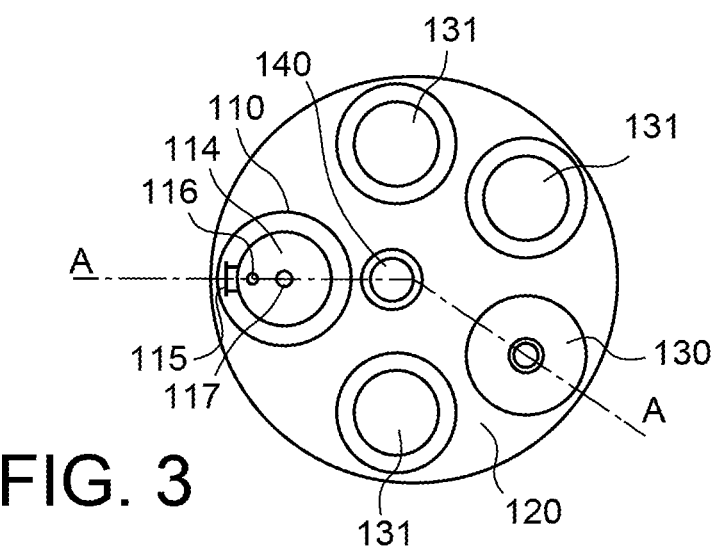
FIG. 3 illustrates a top view of a facility according to the invention in which a single filter is mounted among the four filters of the facility and in which the manhole is not closed.

Such a facility 1 includes:
- a burner 114,
- a reaction chamber 110 disposed at the outlet of the burner 114 and including an inlet of uranyl nitrate hydrate, said reaction chamber 110 and the burner being configured to make a thermal denitration of the uranyl nitrate hydrate and to form uranium trioxide $UO_3$ having the form of particles,
- a separation chamber 120 adapted to separate a part of the $UO_3$ particles from the gases from the thermal denitration made in the reaction chamber 110, the separation chamber 120 being a sedimentation chamber, and
- four filters 130, as illustrated in FIG. 3, configured to separate the other part of the $UO_3$ particles from said gases and thus to scrub said gases, each of these filters 130 being connected to a gas outlet 131 of the separation chamber 120.

The burner 114 and the reaction chamber 110 are in accordance with the burner 4 and the reaction chamber 1 described in document [2], with the difference that the reaction chamber 110 directly opens into the separation chamber 120. Thus, for the present facility 1, there is no conduit 9 connecting the reaction chamber 110 to the separation chamber 120. Further, the reaction chamber 110 has no end extending into a cone reducing the outlet section.

Thus, as regards the operating principle and the structural characteristics of the reaction chamber 110 and the burner 114 as well as those of the outlet section of the reaction chamber 110, the description of document [2] is referred to.

The burner 114 comprises:
- a conduit 117 for feeding uranyl nitrate hydrate, said conduit 117 being connected to the inlet of the reaction chamber 110.
- a fuel gas supply 116, and
- an air supply 115.

The outlet of the burner 114 is connected to the reaction chamber 110. The latter includes an inlet cone through which the combustion gases and the uranyl nitrate hydrate 117 are introduced, a cylindrical shell and an outlet 113.

Unlike the reaction chamber 1 of document [2], the outlet 113 of the reaction chamber 110 extends the cylindrical shape with a straight section, that is a substantially constant section. The outlet 113 of the reaction chamber 110, or mouth, directly opens into the separation chamber 120.

The reaction chamber 110 is partly housed in the separation chamber 120. In this manner, the reaction chamber 110 opens into the separation chamber 120 at a vertical dimension lower than that of the gas outlet 131 of the filters 130.

The burner 114 and the reaction chamber 110 are configured to provide, at the outlet of the reaction chamber 110, a gas rate between 1 m/s and 2 m/s and advantageously between 1.4 m/s and 1.7 m/s.

The mouth 113 of the reaction chamber 110 defines a sedimentation location 121 in the separation chamber 120. Thus, when gases and $UO_3$ particles exit from the reaction chamber 110 after the thermal denitration reaction, they are deflected by the mouth onto the sedimentation location 121. The vertical dimension of the sedimentation location 121 thus corresponds, as illustrated in FIG. 2, to the vertical dimension of the mouth 113 of the reaction chamber 110.

Such a partial housing of the reaction chamber 110 in the separation chamber 120 forms a deflecting means for deflecting the gases and $UO_3$ particles into the sedimentation location 121.

The separation chamber 120 has, as shown in FIGS. 2 and 3, a circular horizontal section and a triangular vertical section. In this manner, the separation chamber 120 has generally a conical shape the apex of which is facing downwardly. The side walls 122 of the separation chamber 120 have an angle with respect to the vertical which is between 0° and 45°. The side walls 122 of the separation chamber 120 thus have only wall sections making an angle with the vertical which is lower than 60°, and more particularly than 45°.

It will be noted that the side wall 122 at the mouth 113 has an angle with respect to the vertical which is close to 0°. Thus, the depositions of particles which could occur onto the side walls 122 of the separation chamber 120 are cancelled.

The lower part of the separation chamber 120 includes, as shown in FIG. 2, a particle outlet 123 for recovering $UO_3$ particles after they are separated from the gases. The upper part of the separation chamber 120 includes, as illustrated in FIG. 3, four gas outlets 131 each equipped with a filter 130 to discharge the gases after they are separated from the particles. The gas outlets 131 each define a vertical dimension of the gas outlet. In the present embodiment, the gas outlets 131 define a same vertical dimension of gas outlet which corresponds to the vertical dimension of the gas outlet. In the case where several filters 130 with gas outlets 131 having different vertical dimensions of gas outlet would be provided, the vertical dimension of the gas outlet corresponds of course to the smallest vertical dimension of the gas outlet.

The vertical dimension of the gas outlet 131 is higher than that of the mouth 113 of the reaction chamber 110 by a height h.

The upper part of the separation chamber 120 can also be provided, as illustrated in FIG. 2, with a man hole 140 to enable the separation chamber 120 to be inspected and maintained.

The separation chamber 120 has a height H. This height H of the separation chamber 120 is defined in connection with the height h which corresponds to the difference of vertical dimension between the sedimentation location 121 and that of the gas outlet 131 by a height h. Indeed, the ratio h to H, noted h/H, is between 0.1 and 0.5, advantageously between 0.2 and 0.3, and preferentially, between 0.23 and 0.27.

It will be noted that the ratio h/H is preferentially set to 0.25.

Thus, typically, the separation chamber 120 can have a maximum lateral dimension between 3 m and 8 m, advantageously between 4.5 m and 6.5 m. Thus likewise, the height H of the separation chamber 120 can be between 5 m and 12 m, advantageously between 6 m and 9 m.

The filters 130 are sintered metal type filters, as illustrated in FIGS. 2 and 3, a single filter 130 being represented in FIG. 3, three of the gas outlets 131 being represented without the filter 130. These filters enable the other part of the $UO_3$ particles to be separated from the gases, which particles have not been separated upon separation by sedimentation. Like this, the gases are scrubbed.

During this separation at the filters 130, the $UO_3$ particles which have been not separated from the gases by sedimentation are built up on the filters 130. Thus, in the facility 1, a continuous declogging means (not represented) is provided, for collecting these $UO_3$ particles. During this collection, $UO_3$ particles fall, under the gravity effect, into the separation chamber 120, to be recovered at the particle outlet 123 of the separation chamber 120.

Typically, each filter 130 can have a diameter between 0.7 m and 1.7 m, advantageously between 1.0 m and 1.4 m.

It is to be noted that if in this embodiment, the facility includes four filters 130, it is also contemplatable, without departing from the scope of the invention, that the facility includes a different number of filters. Thus, the facility can be alternatively equipped with only two filters 130, or even a single filter or even six filters, as long as these, or this, is (are) suitably dimensioned. Of course, the arrangement of the filters 130 as described in this embodiment is perfectly compatible with these alternatives as long as the filter distribution on the upper part of the separation chamber 120 is adapted to the number of filters present.

Alternatively to such an arrangement of the reaction chamber 110 partly housed in the separation chamber 120, FIGS. 4a and 4b schematically illustrate two other possible arrangements between the reaction chamber 110 and the separation chamber 120 for a facility 1 according to the invention.

A facility 1 according to the first alternative depicted in FIG. 4a is differentiated from the facility illustrated in FIG. 2 in that the reaction chamber 110 is not housed in the separation chamber 120 with however a mouth 113 of the reaction chamber 110 in the separation chamber 120 the vertical dimension of which remains lower than that of the gas outlet 131.

According to this first alternative of the invention, the separation chamber 120 has a portion of its upper part, that accommodating the mouth 113 of the reaction chamber 110, lowered with respect to the rest of the upper part which accommodates the filters 130. Such a lowering of a portion of the upper part of the separation chamber 120 forms a deflecting means for deflecting the gases and particles into the sedimentation location 121.

Indeed, in this first alternative, it is this lowering which enables positioning of the mouth 113 of the reaction chamber 110, and thus also the sedimentation location 121, in the separation chamber 120 with respect to the gas outlet 131.

A facility 1 according to a second alternative is depicted in FIG. 4b. Such a facility 1 is differentiated from the facility 1 illustrated in FIG. 3 in that the reaction chamber 110 opens into the separation chamber 120 substantially at the same vertical dimension as the gas outlet 131 and in that it is provided a deflecting wall 124 separating the mouth 113 from the reaction chamber 110 in the separation chamber 120 of the gas outlet 131. The lower end of the deflecting wall 124 defines the sedimentation location 121 and enables gas and particles at the outlet of the mouth 113 of the reaction chamber 110 to be deflected up to the sedimentation location 121.

Thus, according to this second alternative of the invention, the deflecting wall 124 forms a deflecting means for deflecting gases and particles into the sedimentation location 121.

A facility 1 according to the invention can be implemented to make a process for thermally denitrating a uranyl nitrate hydrate having the formula $UO_2(NO_3)_2, xH_2O$ with $2 \leq x \leq 6$ in order to obtain $UO_3$ particles.

Such a process comprises:
- a step of thermally denitrating a uranyl nitrate in a reaction chamber 110 by means of a burner 114, the reaction chamber 110 being disposed at the outlet of said burner 114, whereby $UO_3$ particles are obtained in a mixture with gases,
- a step of separating these $UO_3$ particles from the gases which is made in a sedimentation chamber 120 into which the reaction chamber 110 directly opens,
- a filtration step for separating the other part of the $UO_3$ particles from said gases and thus scrubbing said gases, said step being made at a temperature higher than or equal to 350° C., and
- a step of recovering the $UO_3$ particles.

The step of separating $UO_3$ particles comprises the following sub-steps of:
- deflecting the particles and gases from the heat treatment step into a sedimentation location 121 having a vertical dimension lower than that of the filter 130 used during the filtration step,
- sedimenting a part of the $UO_3$ particles which is collected in the sedimentation chamber 120.

Two syntheses of uranium trioxide $UO_3$ particles have been made by thermally denitrating uranyl nitrate hexahydrate $UO_2(NO_3)_2, 6H_2O$.

Figure 1:
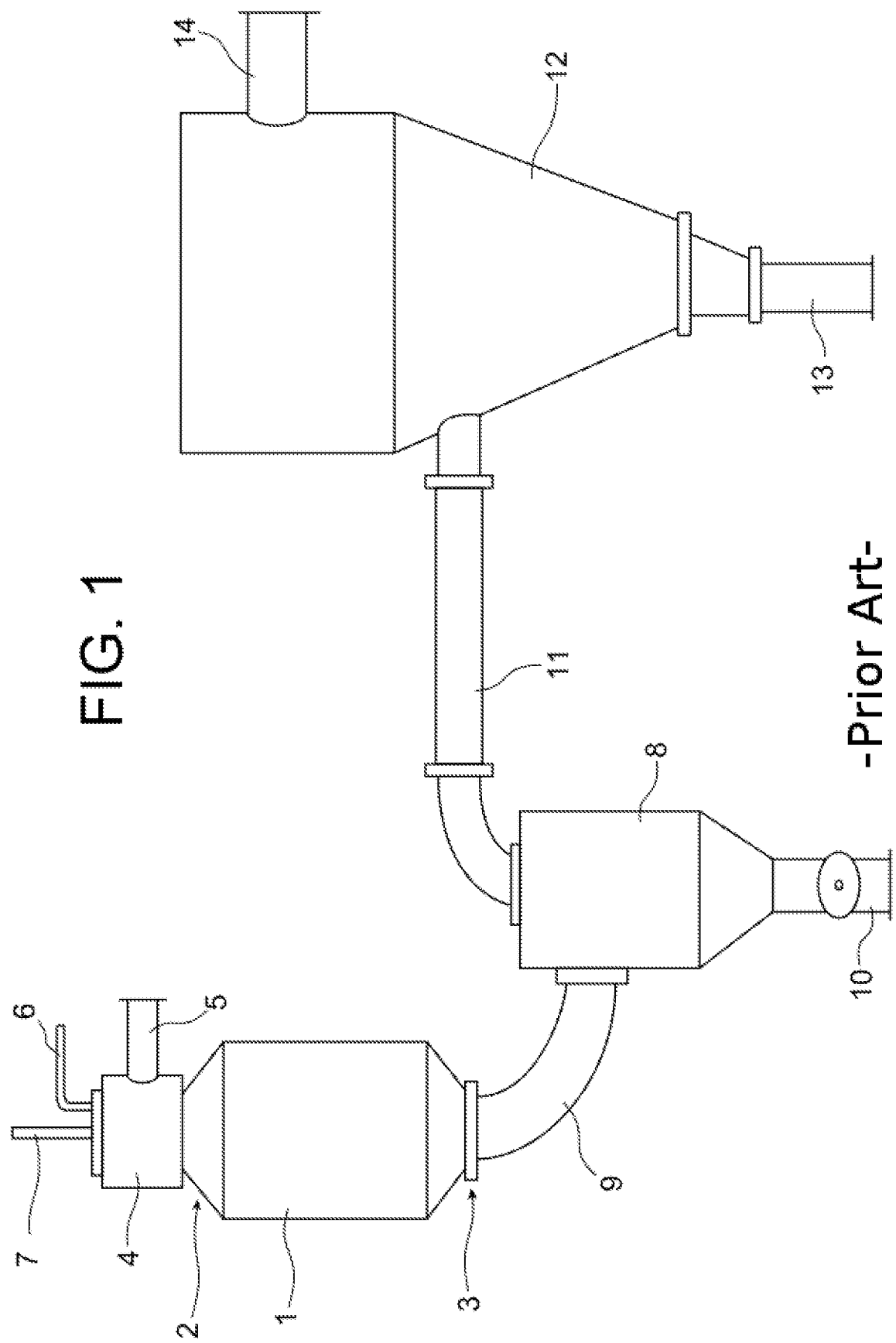

The first synthesis, noted S1, has been made in a comparative facility, in accordance with the teaching of document [2] and illustrated in FIG. 1.

The second synthesis, noted S2, has been made in a facility in accordance with the invention and illustrated in FIGS. 2 and 3.

It is reminded that the burners 4 and 114 as well as the upper part of each of the reaction chambers 1 and 110, or reaction zone in which the thermal denitration reaction and the formation of $UO_3$ particles occur, are identical.

The operating conditions for introducing the reaction gases and uranyl nitrate hexahydrate in the reaction chamber 1, or 110, via the burner 4, or 114, have also been identical for both syntheses S1 and S2:
- introduction flow rate for $UO_2(NO_3)_2, 6H_2O$ in the piping 7 and the conduit 117: 70 kg/h,
- introduction flow rate for natural gas in the piping 6 and the supply 116: 5 kg/h, and
- introduction flow rate of air in the piping 5 and the supply 115: 150 kg/h.

The burner 4, 114 ensures natural gas combustion in the air overcharged by exciting a spark plug not represented in FIGS. 1 to 3. The combustion is fully made in the burner 4, 114, the uranyl nitrate hexahydrate injected is never in contact with the flame.

The gases resulting from the combustion, of a temperature of about 1 400° C., are accelerated in the burner 4, 114 to reach a rate of about 300 m/s in the upper conical part of the reaction chamber 1, 110, or reaction zone in which the contact of hot combustion gases and uranyl nitrate hexahydrate sprayed in fine droplets is made.

The $UO_3$ particles obtained at the end of the first synthesis S1 have been collected, on the one hand by the conduit 10 and, on the other hand, by the conduit 13.

The $UO_3$ particles obtained at the end of the second synthesis S2 have been collected by the single outlet 123 of the sedimentation chamber 120.

These different $UO_3$ particles have been analysed so as to define their BET specific surface area as well as their water weight percentages, on the one hand, and nitrate ions $NO_3^-$, on the other hand.

Within the scope of the first synthesis S1, the same analyses have been conducted on the mixture formed by the $UO_3$ particles collected by the conduits 10 and 13 (noted 10+13).

The intervals of values for the specific surface area and water and $NO_3^-$ weight percentages as obtained on several tests are reported in table 1 below. In this table 1, the collection yields of $UO_3$ particles are also indicated.

TABLE 1

| Synthesis | Collection zone | Yield (%) | BET specific surface area (m²/g) | Water weight percentage (% wt) | $NO_3^-$ weight percentage (% wt) |
|---|---|---|---|---|---|
| S1 | 10 | 30 | from 20 to 25 | from 0.4 to 0.6 | from 1 to 4 |
|  | 13 | 70 | from 2 to 10 | from 1.5 to 7 | from 2.7 to 17 |
|  | 10 + 13 | 100 | from 12 to 15 | from 1 to 1.2 | from 1.2 to 5.3 |
| S2 | 123 | 100 | from 18 to 20 | from 0.3 to 0.4 | from 0.3 to 0.7 |

The $UO_3$ particles as obtained by the implementation of the thermal denitration process in a facility in accordance with the invention (synthesis S2) thus have a BET specific surface area which is higher than that of the mixture of the $UO_3$ particles collected by the conduits 10 and 13.

Furthermore, the $UO_3$ particles obtained by the second synthesis S2 have very low contamination rates with water and nitrate ions, respectively lower than 0.4% wt and 0.7% wt. Such percentages further promote reactivity of $UO_3$ particles for their subsequent transformation into $UO_2$ and then $UF_4$.

Further, it is to be noted that the facility of prior art implemented during the first synthesis S1 has required to cool the stream circulating through the conduit 11 by means of a complementary cooling device ensuring an air flow rate of 300 kg/h. The scrubbed gases have in turn been sucked at the outlet of the bag filter 12 by means of a fan ensuring a suction flow rate of 485 kg/h, hence it is necessary to use higher size pieces of equipment and a higher energy consumption than in the configuration of synthesis S2.

In the facility in accordance with the invention implemented during the second synthesis S2, the scrubbed gases have been sucked at the outlet of the filters 130 by means of fans ensuring a suction flow rate of 185 kg/h, that is lower than the previous one and in the absence of a complementary cooling device.

BIBLIOGRAPHY

[1] WO 84/02124 A1
[2] U.S. Pat. No. 5,628,048

What is claimed is:

1. A facility for thermally denitrating a uranyl nitrate hydrate, having the formula $UO_2(NO_3)_2, xH_2O$ with $2 \leq x \leq 6$, into uranium trioxide $UO_3$ including:
    a burner,
    a reaction chamber disposed at the outlet of the burner and including an inlet of uranyl nitrate hydrate, said reaction chamber and the burner being configured to make a thermal denitration of the uranyl nitrate hydrate and to form uranium trioxide $UO_3$ having the form of particles,
    a separation chamber adapted to separate a part of the $UO_3$ particles from gases from the thermal denitration made in the reaction chamber, and
    at least one filter configured to separate another part of the $UO_3$ particles from the gases and thus scrub the gases,
    wherein the separation chamber is a sedimentation chamber into which the reaction chamber directly opens at an opening of the sedimentation chamber, the opening of the sedimentation chamber being above a particle outlet of the sedimentation chamber, the particle outlet being configured to recover the part of the $UO_3$ particle separated from the gases into the separation chamber,
    and wherein the filter is able to make the separation at a temperature higher than or equal to 350° C.

2. The facility according to claim 1, wherein the separation chamber includes at least one gas outlet towards the filter,
    and wherein the facility further comprises at least one gas deflecting means for deflecting the gases and the $UO_3$ particles exiting the mouth of the reaction chamber into the separation chamber at a sedimentation location of the separation chamber the vertical dimension of which is lower than the vertical dimension of the gas outlet.

3. The facility according to claim 2, wherein the vertical dimension of the sedimentation location is lower than that of the gas outlet by a height h, the separation chamber having a height H,
    and wherein the ratio h to H is between 0.1 and 0.5.

4. The facility according to claim 2, wherein the gas deflecting means is provided by a partial housing of the reaction chamber in the separation chamber, the mouth of the reaction chamber in the separation chamber defining the sedimentation location.

5. The facility according to claim 2, wherein the gas deflecting means includes a deflecting wall separating the mouth from the reaction chamber of the gas outlet, the lower end of said deflecting wall defining the sedimentation location.

6. The facility according to claim 1, wherein the side walls of the separation chamber have only wall sections making an angle with the vertical which is lower than 60°.

7. The facility according to claim 1, wherein the filter is of the sintered metal type filter.

8. The facility according to claim 7, including at least two parallel filters of the sintered metal type.

9. The facility according to claim 1 wherein the burner and the reaction chamber are configured to provide, at the outlet of the reaction chamber, a gas rate between 1 m/s and 2 m/s.

10. A process for thermally denitrating a uranyl nitrate hydrate having the formula $UO_2(NO_3)_2, xH_2O$ with $2 \leq x \leq 6$, the process comprising:
    providing the facility of claim 1; and
    thermally denitrating the uranyl nitrate hydrate in the reaction chamber.

11. The process according to claim 10, wherein the uranyl nitrate hydrate is uranyl nitrate hexahydrate of the formula $UO_2(NO_3)_2, 6H_2O$.

12. The process for thermally denitrating a uranyl nitrate hydrate having the formula $UO_2(NO_3)_2, xH_2O$ with $2 \leq x \leq 6$ according to claim 10, the process comprising:
    a step of thermally denitrating a uranyl nitrate in the reaction chamber by means of the burner, whereby $UO_3$ particles are obtained in a mixture with gases,
    a step of separating a part of the $UO_3$ particles which are mixed with gases from the gases, the separating being made in the sedimentation chamber,
    a filtration step for separating another part of the $UO_3$ particles which are mixed with gases from the gases and thus scrubbing the gases using the filter, the filtration step being made at a temperature higher than or equal to 350° C., and
    a step of recovering the $UO_3$ particles thereby obtaining an thermally denitrating of the uranyl nitrate hydrate having the formula $UO_2(NO_3)_2, xH_2O$ with $2 \leq x \leq 6$.

13. The process according to claim 12, wherein the step of separating a part of the $UO_3$ particles from the gases comprises the following sub-steps of:
    deflecting the $UO_3$ particles and gases from the heat treatment step into a sedimentation location having a vertical dimension lower than a gas outlet of the filter used during the filtration step,
    sedimenting a part of the $UO_3$ particles which is collected in the sedimentation chamber.

14. The process according to claim 12, wherein, during the separation step, the gases from the thermal denitration are introduced in the separation chamber with a gas rate between 1 m/s and 2 m/s.

15. A facility for thermally denitrating a uranyl nitrate hydrate, having the formula $UO_2(NO_3)_2, xH_2O$ with $2 \leq x \leq 6$, into uranium trioxide $UO_3$ including:
    a burner,
    a reaction chamber disposed at the outlet of the burner and including an inlet of uranyl nitrate hydrate, said reaction chamber and the burner being configured to make a thermal denitration of the uranyl nitrate hydrate and to form uranium trioxide $UO_3$ having the form of particles,
    a separation chamber adapted to separate a part of the $UO_3$ particles from gases from the thermal denitration made in the reaction chamber, and
    a least one filter configured to separate another part of the $UO_3$ particles from the gases and thus scrub the gases,
    wherein the separation chamber is a sedimentation chamber into which the reaction chamber directly opens,
    wherein the reaction chamber directly opens in an upper part of the separation chamber, and wherein the filter is able to make the separation at a temperature higher than or equal to 350° C.

* * * * *